US011671901B2

(12) United States Patent
Tseng et al.

(10) Patent No.: US 11,671,901 B2
(45) Date of Patent: Jun. 6, 2023

(54) MANAGEMENT OF SYSTEM INFORMATION BLOCK SEGMENTATION

(71) Applicant: FG Innovation Company Limited, Tuen Mun (HK)

(72) Inventors: Yung-Lan Tseng, Taipei (TW); Hung-Chen Chen, Taipei (TW); Mei-Ju Shih, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/333,413

(22) Filed: May 28, 2021

(65) Prior Publication Data

US 2021/0377844 A1 Dec. 2, 2021

Related U.S. Application Data

(60) Provisional application No. 63/032,490, filed on May 29, 2020.

(51) Int. Cl.
  *H04W 48/10* (2009.01)
  *H04W 72/0453* (2023.01)
  *H04W 48/20* (2009.01)

(52) U.S. Cl.
  CPC .......... *H04W 48/10* (2013.01); *H04W 48/20* (2013.01); *H04W 72/0453* (2013.01)

(58) Field of Classification Search
  CPC ..... H04W 48/10; H04W 48/12; H04W 48/20; H04W 72/0453
  See application file for complete search history.

(56) References Cited

U.S. PATENT DOCUMENTS

2007/0260851 A1* 11/2007 Taha ................ H04W 52/0229
                                                      712/204
2010/0183031 A1*  7/2010 Dalsgaard ............ H04W 28/06
                                                      370/474
(Continued)

FOREIGN PATENT DOCUMENTS

CN       101690012 A      3/2010
CN       101720560 A      6/2010
(Continued)

OTHER PUBLICATIONS

"3rd Generation Partnership Project, Technical Specification Group Radio Access Network, NR, Radio Resource Control (RRC) protocol specification", 3GPP TS 38.331 V16.0.0 (Mar. 2020).
3GPP TS 38.304, "3rd Generation Partnership Project; Technical Specification Group Radio Access Network; NR; User Equipment (UE) procedures in Idle mode and RRC Inactive state (Release 16)", V16.0.0 (Mar. 2020).
(Continued)

Primary Examiner — Siu M Lee
(74) Attorney, Agent, or Firm — ScienBiziP, P.C.

(57) ABSTRACT

Some of the present implementations provide a method for assembling a target SIB for a target service. The method receives, from a first cell on a first frequency carrier, a plurality of SIB segments of the target SIB, each of the plurality of SIB segments associated with a corresponding value tag. The method stores a first SIB segment in the plurality of SIB segments in a memory of the UE. For each subsequent SIB segment in the plurality of SIB segments, the method determines whether a corresponding value tag of the subsequent SIB segment is the same as the corresponding value tag of the first SIB segment and if they are the same, stores the subsequent SIB segment in the memory of the UE. The method then assembles the target SIB using the stored plurality of SIB segments.

20 Claims, 6 Drawing Sheets

(56) References Cited

U.S. PATENT DOCUMENTS

| | | | | |
|---|---|---|---|---|
| 2011/0069667 A1* | 3/2011 | Grovlen | ............... | H04W 72/14 |
| | | | | 370/329 |
| 2011/0320856 A1* | 12/2011 | Deivasigamani | ..... | H04L 1/0053 |
| | | | | 714/2 |
| 2015/0223148 A1* | 8/2015 | Shi | ................... | H04W 52/0216 |
| | | | | 370/312 |
| 2015/0382284 A1* | 12/2015 | Brismar | ............. | H04W 28/085 |
| | | | | 370/329 |

FOREIGN PATENT DOCUMENTS

| | | |
|---|---|---|
| WO | 2009/004012 A1 | 1/2009 |
| WO | 2019/137406 A1 | 7/2019 |

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 16)", V16.0.0 (Mar. 2020).

3GPP TS 38.133, "3rd Generation Partnership Project; Technical Specification Group Radio Access Network; NR; Requirements for support of radio resource management (Release 16)", V16.3.0 (Mar. 2020).

3GPP TS 38.213, "3rd Generation Partnership Project; Technical Specification Group Radio Access Network; NR; Physical layer procedures for control (Release 16)", V16.1.0 (Mar. 2020).

\* cited by examiner

MANAGEMENT OF SYSTEM INFORMATION BLOCK SEGMENTATION

CROSS-REFERENCE TO RELATED APPLICATION(S)

The present application claims the benefit of and priority to a provisional U.S. Patent Application Ser. No. 63/032,490, filed on May 29, 2020, entitled "SYSTEM INFORMATION BLOCK SEGMENTATION MANAGEMENT MECHANISM," (hereinafter referred to as "US81520 application"), the content of which is hereby incorporated fully by reference into the present application.

FIELD

The present disclosure generally relates to wireless communications, and more particularly, to management of system information block (SIB) segmentation for a user equipment (UE) in the next generation wireless networks.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

According to the 3rd Generation Partnership Project (3GPP) NR, system information (or system information blocks (SIBs)) may relay numerous control information to the UEs. For example, an emergency-related message, such as an earthquake message, that may be sent to several UEs, may include many different pieces of information that have to be transmitted to the UEs. Because of the high amount of information, a cell (e.g., associated with a base station) may divide or segment the data of a SIB into different groups or segments, which are called SIB segments. As an example, for an NR Vehicle-to-Everything (V2X) service, one or more base stations (e.g., gNBs) in the NR-Radio Access Network (NR-RAN) may divide the system information (SI) associated with the NR V2X service (and/or an LTE V2X service) into several smaller SIB segments. For example, a SIB12 of a V2X service may be divided into two or more SIB12 segments (e.g., by one or more serving cells). A UE that has interest in the V2X service may then store all the different SIB segments that are delivered by the UE's serving cell(s). Once all the segments of the target SIB (e.g., SIB12) are successfully received and stored, the UE may attempt to assemble the complete/target SIB.

Furthermore, a serving cell may also broadcast other data, such as other parameters, that are associated with each segment of a SIB. The data associated with each SIB segment, such as a segment number (e.g., an integer within a range of 0 to 63), a segment type (e.g., an enumerator to further indicate that a corresponding SIB segment is the last SIB segment or not), etc., may identify the corresponding segment. Based on such received (or configured) identifying data, the UE may be able to assemble a target SIB. Taking the V2X service as an example, the UE may implement the Access Stratum configurations of the PC5 and Uu interfaces based on the received complete/target V2X-SIB(s). To assemble a target SIB based on the received SIB segments, however, a UE does not check the validity of the SIB segments while receiving and storing the segments. To increase the efficiency of SIB segment management, it is desirable that the validity of each segment of a target SIB is checked before a SIB assembly procedure can be triggered for the target SIB.

SUMMARY

The present disclosure is directed to management of small data transmission by a user equipment (UE) while the UE is in an RRC_INACTIVE state.

In a first aspect of the present application, a method for a user equipment (UE) for assembling a target system information block (SIB) for a target service is provided. The method includes receiving, from a first cell on a first frequency carrier, a plurality of SIB segments of the target SIB, each of the plurality of SIB segments associated with a corresponding value tag and storing a first SIB segment in the plurality of SIB segments in a memory of the UE. For each subsequent SIB segment in the plurality of SIB segments the method determines whether a corresponding value tag of the subsequent SIB segment is the same as the corresponding value tag of the first SIB segment and stores the subsequent SIB segment in the memory of the UE when the corresponding value tag of the subsequent SIB segment is the same as the corresponding value tag of the first SIB segment. The method then assembles the target SIB using the stored plurality of SIB segments.

An implementation of the first aspect further comprises selecting, by the UE, a second cell on the first frequency carrier before the assembling of the target SIB successfully; and dropping the stored plurality of SIB segments after selecting the second cell.

In another implementation of the first aspect, the first frequency carrier comprises a serving frequency carrier for the UE, and the first cell and the second selected cell are serving cells of the UE.

In another implementation of the first aspect, the first frequency carrier comprises a non-serving frequency carrier for the UE, and the first cell and the second cell are not serving cells of the UE.

Another implementation of the first aspect further comprises, when the corresponding value tag of the subsequent SIB segment is not the same as the corresponding value tag of the first SIB segment: storing the subsequent SIB segment in the memory of the UE; and removing the first SIB segment and all previously stored SIB segments that have the same value tag as the first SIB segment from the memory.

Another implementation of the first aspect further comprises after assembling the target SIB successfully, configuring a validity area of the target SIB with a first area identification (ID) if the target SIB is associated with a first areascope information element (IE), wherein both of the first areascope IE and the first area ID are broadcast by the first cell; selecting, by the UE, a second cell on the first frequency carrier, the second cell broadcasting a second area scope IE and a second area ID associated with a second SIB which is configured by the second cell to support the same target service; and determining that the stored target SIB (or the stored SIB segments of the target SIB) is still valid during the selection of the second cell if the second area ID is the same as the first area ID associated with the target SIB. It should be noted that, in some implementations, after the selection of the second cell, the UE may check both the area IDs (e.g., if the areascope associated with the target SIB='true' in the first cell and/or the second cell) and the value tags broadcast by the first cell and second cell for the validity check of the same target SIB (or for the validity check of the SIB segments of the target SIB).

Another implementation of the first aspect further comprises selecting, by the UE, a third cell on the first frequency carrier, the third cell broadcasting a third area ID, which is different from the first area ID associated with the target SIB; and determining that the target SIB (or the stored SIB segments of the target SIB) is not valid during the selection of the third cell.

Another implementation of the first aspect further comprises selecting, by the UE, a third cell on the first frequency carrier, wherein the third cell does not broadcast any SIB related information that supports the same target service, or the third cell broadcasts data associated with a third SIB that supports the same target service but does not have an associated areascope IE; and determining that the stored target SIB (or the stored SIB segments of the target SIB) is not valid, during the selection of the third cell.

Another implementation of the first aspect further comprises after assembling the target SIB successfully, configuring downlink coverage of the first cell as a validity area associated with the target SIB on the UE if the target SIB is not associated with any areascope information element (IE) sent by the first cell (e.g., the validity area associated with the target SIB is the downlink coverage of the serving cell, which is the cell from which the UE obtains the target SIB. The downlink coverage of the serving cell may be decided based on the Downlink Reference Signal Received Power (DL-RSRP) measured by the UE, such as the locations for which the UE has higher DL-RSRP measurement result than a pre-defined DL-RSRP threshold).

In another implementation of the first aspect, the target service comprises a new radio (NR) sidelink communication service and the target SIB includes NR sidelink radio configuration, and after reselecting another cell on the first frequency carrier, the UE implements the NR sidelink communication service based on the NR sidelink radio configuration in the stored target SIB if the stored target SIB is determined to be valid on the reselected cell.

In another implementation of the first aspect, the target service comprises an Evolved Universal Terrestrial Radio Access (E-UTRA) Vehicle-To-Everything (V2X) sidelink communication service and the target SIB includes E-UTRA V2X sidelink radio configuration, and after reselecting another cell on the first frequency carrier, the UE implements the E-UTRA V2X sidelink communication service based on the E-UTRA V2X sidelink radio configuration in the stored target SIB if the stored target SIB is determined to be valid on the reselected cell.

In a second aspect, a UE comprising one or more non-transitory computer-readable media having computer-executable instructions for assembling a target system information block (SIB) for a target service is provided. The processor is coupled to the one or more non-transitory computer-readable media, and configured to execute the computer-executable instructions to receive, from a first cell on a first frequency carrier, a plurality of SIB segments of the target SIB, each of the plurality of SIB segments associated with a corresponding value tag; store a first SIB segment in the plurality of SIB segments in a memory of the UE; for each subsequent SIB segment in the plurality of SIB segments: determine whether a corresponding value tag of the subsequent SIB segment is the same as the corresponding value tag of the first SIB segment, and store the subsequent SIB segment in the memory of the UE when the corresponding value tag of the subsequent SIB segment is the same as the corresponding value tag of the first SIB segment; and finally assemble the target SIB using the stored plurality of SIB segments.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
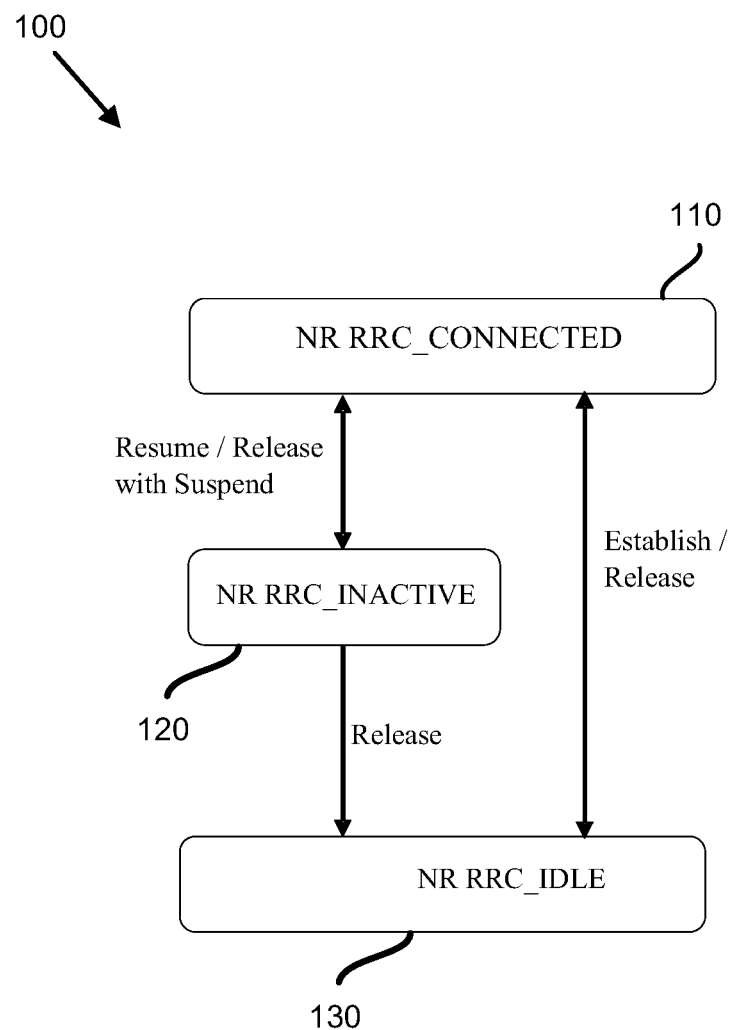
FIG. 1 is a diagram illustrating a UE state machine and the UE's state transitions, according to an example implementation of the present application.

The acronyms in the present application are defined as follows and unless otherwise specified, the acronyms have the following meanings:

| Acronym | Full name |
| --- | --- |
| 3GPP | 3rd Generation Partnership Project |
| 5GC | 5G Core |
| ACK | Acknowledgement |
| AMF | Access and Mobility Management Function |
| ARQ | Automatic Repeat Request |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CBRA | Contention Based Random Access |
| CFRA | Contention Free Random Access |
| CG | Configured Grant |
| CM | Connection Management |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |

| Acronym | Full name |
| --- | --- |
| HARQ | Hybrid Automatic Repeat Request |
| IE | Information Element |
| LCH | Logical Channel |
| LCG | Logical Channel Group |
| LCP | Logical Channel Prioritization |
| MAC | Medium Access Control |
| MIB | Master Information Block |
| MSG | Message |
| NAS | Non-Access Stratum |
| NG-RAN | Next-Generation Radio Access Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RB | Radio Bearer |
| Rel | Release |
| RLC | Radio Link Control |
| RNA | RAN-based Notification Area |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SLIV | Start and Length Indicator |
| SNPN | Stand-alone Non-Public Network |
| SR | Scheduling Request |
| SRB | Signaling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UE | User Equipment |
| UL | Uplink |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PS Cell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, since the amount of data associated with a system information block (SIB), such as SIB12, SIB13, SIB14, etc., may not fit into one system information message (e.g., sent via one or more control signaling(s)

during one system information window time period), one or more serving cells (e.g., associated with one or more base stations) may divide the SIB data into different segments and transmit these segments to one or more UEs via system information delivery. The serving cell(s) may also broadcast other information (e.g., parameters) associated with a SIB segment, such as the segment number, segment type (e.g., an indicator, such as the parameter LastSegment or NotLastSegment), etc., that identify the corresponding segment, to the UEs via the SIB segments delivery. Based on this information, the UE may assemble a complete target SIB. A UE may, however, need to check the validity of each received segment before storing the received segment (e.g., and before assembling the target SIB from the stored segments).

Therefore, some of the present implementations provide a SIB segment management mechanism for a UE to determine whether to discard, maintain, and/or update each received SIB segment before the UE assembles a corresponding target SIB (e.g., a V2X-SIB) based on the stored SIB segments. In some implementations, a UE may perform a SIB segmentation validity check procedure before the UE assembles the complete target SIB successfully. In some implementations, the UE may leverage the information (e.g., parameters) associated with the SIB segments and broadcast by the serving cell(s) to perform the SIB segmentation validity check procedure. In some implementations, a UE may use a target service (e.g., a V2X service, an NR multi-cast broadcast service, a positioning service, etc.) after a successful assembly of a corresponding target service form the stored associated SIB segments.

It should be noted that even though the mechanisms described above and below for the management of SIB segmentation are mostly described with regard to NR, the described mechanisms may be equally applicable to other Radio Access Technologies (RATs), such as LTE, Narrow Band Internet-of-Things (NB-IoT), New Radio Non-Terrestrial-Network (NR NTN).

In some of the present implementations, the SIB signaling may include identical data that are transmitted by more than one cell in the RAN. As such, in some implementations, a cell may further indicate that a SIB signaling (e.g., a V2X-SIB) may be area-specific. The cell may make such an indication by configuring a particular parameter, such as an area scope parameter (e.g., areaS cope), associated with the SIB (e.g., set the parameter areaScope=true). In addition, a system information area ID parameter (e.g., systeminformationAreaID) may be configured (e.g., to the UE) to be associated with the SIB. As a result, the UE may be able to determine whether the stored SIB is still valid (e.g., to the serving cell) by checking these parameters (e.g., valuetag, areaScope and systeminformationAreaID) received from the serving cell(s) after (or during) a cell (re)selection procedure.

The requirements described herein for a cell (re)selection operation may be applied in a UE in an LTE/NR RRC_INACTIVE, RRC_IDLE and/or RRC_CONNECTED state. As such, such different states are described below first.

FIG. 1 is an RRC state transition diagram illustrating various RRC states and RRC transition procedures that a UE may undergo within a next generation radio access network, according to an exemplary implementation of the present application. The RRC state transition diagram 100 may include RRC_CONNECTED state 110, RRC_INACTIVE state 120, and RRC_IDLE state 130. In some implementations, the RRC Connected, RRC Inactive, and RRC Idle states may be three RRC states independent of one another.

As shown in FIG. 1, a UE may transition among the three RRC states. The proposed mechanism may be applied to the UE during a target SIB reception procedure independent of the UE's RRC state (e.g., RRC_CONNECTED state, RRC_INACTIVE state, and RRC_IDLE state). In addition, the proposed mechanisms may also be applicable to UEs without being impacted by the state transitions between the RRC states.

For example, a UE may transition to RRC_INACTIVE state 120 from RRC_CONNECTED state 110 or may transition from RRC_INACTIVE state 120 to any of RRC_CONNECTED state 110 or RRC_IDLE state 130. However, as shown in RRC state transition diagram 100, a UE may not transition directly from RRC Idle state 130 to RRC Inactive state 120 in some implementations. That is, a UE may transition to RRC Inactive state 120 from RRC Idle state 130 through RRC Connected state 110 in some such implementations. In some aspects of the present implementations, a UE may also transition from RRC Connected state 110 to RRC Inactive state 120 using an RRC Suspend (or RRC Release with Suspend) procedure. Conversely, the UE may transition from RRC Inactive state 120 to RRC Connected state 110 using an RRC (Connection) Resume procedure. Additionally, the UE may use an RRC Release procedure to transition from RRC Connected state 110 or RRC Inactive state 120 to RRC Idle state 130, while using an RRC Establish procedure to transition from RRC Idle state 130 to RRC Connected state 110.

In some implementations, in an RRC_INACTIVE state, a UE may remain as Connection Management (CM)-CONNECTED (e.g., where the UE has signaling connection with AMF) and may move within an area configured by the NG-RAN (e.g., RNA) without notifying the NG-RAN. In the RRC_INACTIVE state, the last serving cell (e.g., associated with a gNB) and the UE itself may keep the UE context (e.g., the UE (Inactive) Access Stratum (AS) context of the UE) and the UE-associated NG connection with the serving AMF and UPF.

In some implementations, the RRC_INACTIVE state may support various functions and/or characteristics, such as, small data transmission (SDT), PLMN selection, SNPN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (e.g., both control/user (C/U)-planes) established for the UE, UE AS context stored in NG-RAN and the UE, NG-RAN determining the RNA to which the UE belongs, etc. In some implementations, for NR connected to 5GC network, a UE's identity (e.g., I-RNTI) may be used to identify the UE context in the RRC_INACTIVE state. The I-RNTI may provide the new NG-RAN node with a reference to the UE context corresponding the old NG-RAN node.

How the new NG-RAN node is able to resolve the old NG-RAN ID from the I-RNTI is a matter of proper configuration in the old and new NG-RAN nodes. Some typical partitioning of a 40-bit I-RNTI my include, but is not limited to, a UE specific reference, an NG-RAN node address index, PLMN-specific information, and SNPN-specific information. A UE specific reference may include a reference to the UE context within a logical NG-RAN node. An NG-RAN node address index may include information that identify the NG-RAN node that allocates the UE specific part. Network-specific information (e.g., PLMN-specific information or SNPN-specific information) may include information that support network sharing deployments, and provide an index to the PLMN ID part of the Global NG-RAN node identifier. SNPN may include a small PLMN that is configured by an operator. Each SNPN may be identified by a unique SNPN identity (ID) (e.g., an identifier for an SNPN may be a combination of a PLMN ID and an NID). A configured grant configuration may be associated with an SNPN ID.

In some implementations, the AS Context for a UE in RRC_INACTIVE state may be stored when the connection is suspended (e.g., when the UE is in an RRC_INACTIVE state) and may be restored/retrieved when the connection is resumed (e.g., when the UE transitions from the RRC_INACTIVE state to an RRC_CONNECTED state). The suspension of the RRC connection may be initiated by the network. When the RRC connection is suspended, the UE may store the UE Inactive AS context (and any related configuration received from the network), and may transition to an RRC_INACTIVE state. If the UE is configured with SCG, the UE may release/suspend (all or part of) the SCG configuration upon initiating an RRC Connection Resume procedure. The RRC message to suspend the RRC connection may be integrity-protected and ciphered. Resumption from a suspended RRC connection may be initiated by upper layers when the UE needs to transition from an RRC_INACTIVE state to an RRC_CONNECTED state, or by the RRC layer to perform an RNA update, or by RAN paging, for example, from NG-RAN. When the RRC connection is resumed, the network may configure the UE according to the RRC connection resume procedure and based on the stored UE Inactive AS context (and any related RRC configuration received from the network). The RRC connection resume procedure may reactivate the AS security and reestablish the SRB(s) and DRB(s).

In some implementations, in response to a request to resume an RRC connection, the network may perform any of the following procedures. In some implementations, in response to such a request, the network may resume the suspended RRC connection and send the UE to an RRC_CONNECTED state, or may reject the request and send the UE to an RRC_INACTIVE state (e.g., with a wait timer). In some other implementations, the network may directly re-suspend the RRC connection in response to the request and send the UE to an RRC_INACTIVE state, or may directly release the (RRC) connection and send the UE to an RRC_IDLE mode. In yet other implementations, in response to a request to resume the RRC connection, the network may instruct the UE to initiate a NAS level recovery (e.g., by sending an RRC setup message to the UE).

In addition, in the RRC_INACTIVE state, the upper layers (or the RRC layer) may configure a UE's specific DRX mechanism. The UE's controlled mobility may be based on the network configuration in the RRC_INACTIVE state, and the UE may store the UE Inactive AS context. Additionally, a RAN-based notification area may be configured by the RRC layer when the UE is in the RRC_INACTIVE state. Furthermore, the UE may perform other functions while in the RRC_INACTIVE state, such as monitoring Short Messages (e.g., that are transmitted with P-RNTI over DCI); monitoring a Paging channel for CN paging (e.g., using 5G-S-TMSI) and RAN paging (e.g., using full I-RNTI); performing neighboring cell measurements and cell (re-)selection; performing RAN-based notification area updates periodically and/or when moving outside the configured RAN-based notification area; and acquiring system information and sending SI request (e.g., if configured).

In some aspects of the present implementations, when a UE (e.g., in an RRC Connected state) attempts to make a communication (e.g., to perform an LTE/NR (V2X) sidelink communication, or a sidelink discovery announcement) on a non-serving frequency, the UE may perform measurements on that frequency for cell selection and/or intra-frequency reselection (e.g., in accordance with the 3GPP technical specification (TS) 38.133 or 38.304 v16.5.0). For example, when a UE is interested in performing a V2X sidelink communication on a non-serving frequency, the UE may perform measurements on that frequency or the frequencies on which inter-carrier V2X sidelink configuration for that frequency (e.g., for cell selection and/or intra-frequency reselection) is provided. If the UE detects at least one cell on the desired frequency on which the UE is configured to perform sidelink operations (e.g., upon fulfilling the S criterion in accordance with TS 36.304 v16.0.0 (or TS 38.304 v16.0.0)), the UE may consider itself to be in-coverage for sidelink operations on that frequency. Conversely, when the UE does not detect any cell on the desired frequency (e.g., that meets the S criterion), the UE may consider itself to be out-of-coverage for sidelink operations on that frequency. In this condition, the UE may implement sidelink operations based on stored sidelink pre-configuration (e.g., which may be pre-installed in the memory module of the UE) on the non-serving frequency carrier while the UE is considered out-of-coverage on the non-serving frequency carrier.

In some implementations, when a UE selects a cell on a non-serving frequency for sidelink communication (or V2X sidelink communication or sidelink discovery announcement), the UE may perform additional intra-frequency cell reselection process(es) to select a better cell for sidelink operations on that frequency (e.g., in accordance with TS 36.304 v16.0.0 (or TS 38.304 v16.0.0)).

In some implementations, a UE may consider a carrier to be preconfigured for sidelink communication (or V2X sidelink communication), or the frequencies to be preconfigured for providing inter-carrier V2X sidelink configuration to have the highest cell reselection priority (e.g., in accordance with TS 36.304 v16.0.0 (or TS 38.304 v16.0.0)).

In some implementations, when the frequency on which the UE is configured to perform sidelink communication is a serving frequency, the UE may use the serving cell on that frequency for the sidelink operation.

As described above, a UE may be able to determine whether a stored target SIB is still valid (e.g., to the serving cell) by checking one or more parameters (e.g., valueTag, areaScope, systeminformationAreaID, etc.) received from the serving cell after (or during) a cell (re)selection procedure. In some of the present implementations, two or more cells within the same configured area (e.g., which provides the same V2X-SIB and/or provides the same systeminformationAreaID that are associated with the V2X-SIB) may also be segmented similarly. That is, the target SIB may be segmented into the same pieces and then identical SIB segments may be transmitted/broadcast by the cells that are within the same configured area. For example, the SIB segments that (i) are broadcast by the cells within the same configured area and (ii) have the same segmentNumber, may contain identical information in some such implementations.

In some implementations, each cell (e.g., among the cells that are within the same configured area) may be capable of delivering the SIB segments in a different manner. For example, one or more cells (e.g., within the same system information area) may broadcast the SIB segments (e.g., continuously), while one or more other cells may broadcast the SIB segments after receiving a SIB request message from one or more UEs (e.g., through a 2-step random access procedure or a 4-step random access procedure). Yet, one or more other cells may transmit the SIB segments to the UE(s), for example, through UE-specific dedicated control signaling (e.g., via an RRCReconfiguration message).

In the initiation phase (e.g., when the UE receives SIB1), in some implementations, if neither the SIB segment nor the current value of a particular parameter (e.g., valueTag, areascope, and/or systemInformationareaID, which the UE may obtain via SIB1 reception form the serving cell on the serving frequency carrier or from the selected non-serving cell on the non-serving frequency carrier) of the target SIB are stored in the UE side, the UE may store the SIB segment(s) and the received values (or parameters/enumerators) from the current received downlink control signaling (e.g., the systeminformationblockType1, SIB1, etc.) from the serving cell or the camped cell. In other words, the UE may store at least one of the value tag parameter, the area scope parameter, and the system information area ID parameter if neither the SIB segment nor any of these parameters are stored during the initiation phase. In some implementations, the valueTag may be an integer within a (predefined) range, for example between 0 to 31. In some implementations, the areaScope indicator may be an enumerator (e.g., false, true), or alternatively, the received signaling may not transmit the areaScope in SIB1. The systemInformationAreaID, in some implementations, may be a bit string (e.g., having up to 24 bits), or alternatively, the systemInformationAreaID may not be present (e.g., in the received signaling).

In some other implementations, the Public Land Mobile Network (PLMN) may also be considered as supporting information in a SIB segmentation management. As such, at the initiation stage, the UE may also store the first PLMN-Identity in the PLMN-IdentityInfoList when the UE starts storing the SIB segments received from a serving cell (e.g., while the serving cell is a Non-Public Network (NPN)-only cell). In some implementations, the UE may store the first NPN-Identity in the NPN-IdentityInfoList when the UE starts storing the SIB segments received from a serving cell.

In some other implementations, a cell that is only available for normal service for the NPNs' subscribers may be referred to as an NPN-only cell. An NPN-capable UE may determine that a cell is an NPN-only cell by determining that the cellReservedForOtherUse IE is set to true (e.g., when the npn-IdentityInfoList IE is present in the CellAccessRelatedInfo). A non-NPN-only cell may include a cell that is not an NPN-only cell. In some implementations, the first NPN-identity may include a PLMN identity and/or a Network Identity (NID), which may be referred to as a standalone NPN (SNPN). The first NPN-identity may include a PLMN identity and/or a Cell Access Group (CAG) identity, which may be referred to as a PNI-Public Network Integrated (PNI-NPN).

In some aspects of the present implementations, a UE may need to check the validity of the stored SIB segments under some circumstances. For example, each time the UE receives a SIB segment (e.g., before the SIB segment could be assembled to a complete target SIB) the UE may perform a SIB segment validity check procedure. Checking the validity of the SIB segments may occur while the UE stays in the same coverage area (e.g., provided by the same cell) or it may occur while the UE moves from one coverage area (e.g., of a first cell) to another coverages area (e.g., of a second cell).

I. Under the Same Coverage Area of a Serving Cell

In some implementations, the UE may stay under the same coverage area of the same serving cell (e.g., on a selected frequency carrier) while collecting the SIB segments of a target SIB. In other words, the stored SIB segments and the stored information associated with the stored SIB segments may also be associated with the identity of the serving cell (e.g., the cellidentity parameter of the serving cell). A UE may obtain the parameter cellidentity from the serving cell by reading the broadcasting system information (e.g., received via SIB1). In some implementations, the UE (e.g., an RRC entity of the UE) may forward the cellidentity parameter to the upper layers (e.g., to Non-Access Stratum (NAS) layer) of the UE.

In some implementations, a UE may discard the stored SIB segments if one or more of the following conditions are met. For example, if the received value of the valueTag parameter associated with the SIB segment is different from the current stored (or configured) value of the valueTag parameter for the corresponding SIB (e.g., V2X-SIB), the UE may discard (e.g., remove/release from storage) the stored SIB segments (e.g., SIB segments that have the initial valueTag value). In some other implementations, instead of, or in conjunction with, the value tag, if the value of the areascope parameter (e.g., whether present or not present) and/or the value of the systemInformationAreaID parameter (e.g., whether present or not present) from the latest DL control signaling (e.g., SIB1) are different from the currently stored values of the areaScope and/or systemInformationAreaID parameters for the associated SIB (e.g., V2X-SIB), the UE may discard the currently stored SIB segments.

For example, a UE may initially store a valueTag that is associated with one or more received SIB segments. Subsequently, the UE may receive a different valueTag that is associated with the same target SIB from the UE's serving cell. The value tag of the same target SIB may change for different reasons. For example, the value tag may change when the serving cell modifies the target SIB before the UE is able to assemble a complete target SIB based on the stored SIB segments (e.g., while the UE is receiving the SIB segments and the valueTag(s) from the same serving cell). In some implementations, the received valueTag may be larger than the stored valueTag or may be smaller than the stored valueTag. Nevertheless, when the received value tags are different, the UE may discard (e.g., remove or release from memory) all of the previously stored SIB segments and then store the latest SIB segments (e.g., all of which are associated with the newly received value tag) received from its serving cell. It should be noted that, even though the other parameters, such as the areaScope and/or the systemInformationAreaID may also be updated when the value tag is updated, the UE may discard the stored segments irrespective of the changes in these parameters (e.g., the UE may not check to determine whether the values of these additional parameters have also been changed).

Figure 2A:
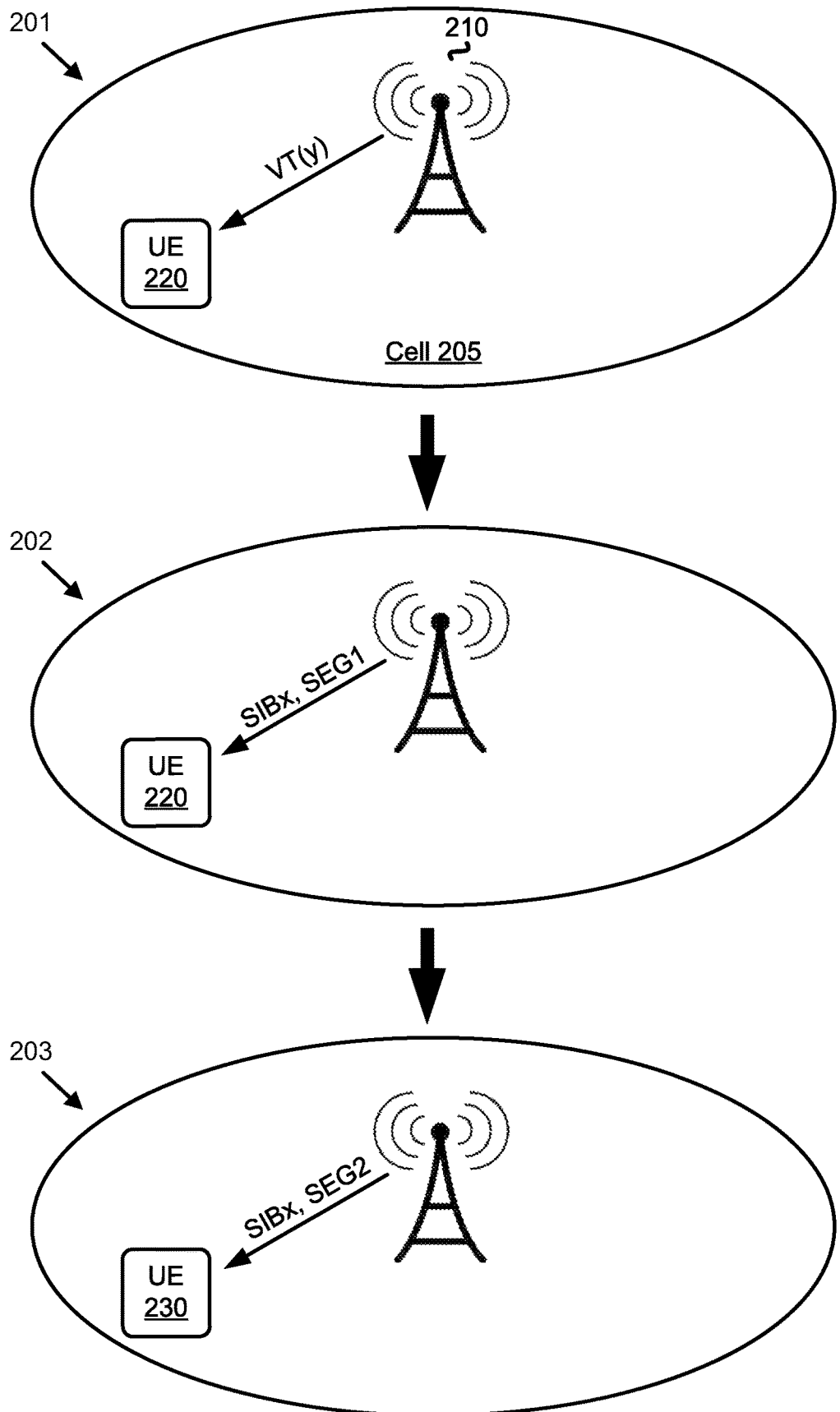
FIGS. 2A-2B are diagrams illustrating the transmission of different value tags and system information block (SIB) segments associated with a target SIB from a base station to a UE, according to an example implementation of the present application.
Figure 2B:
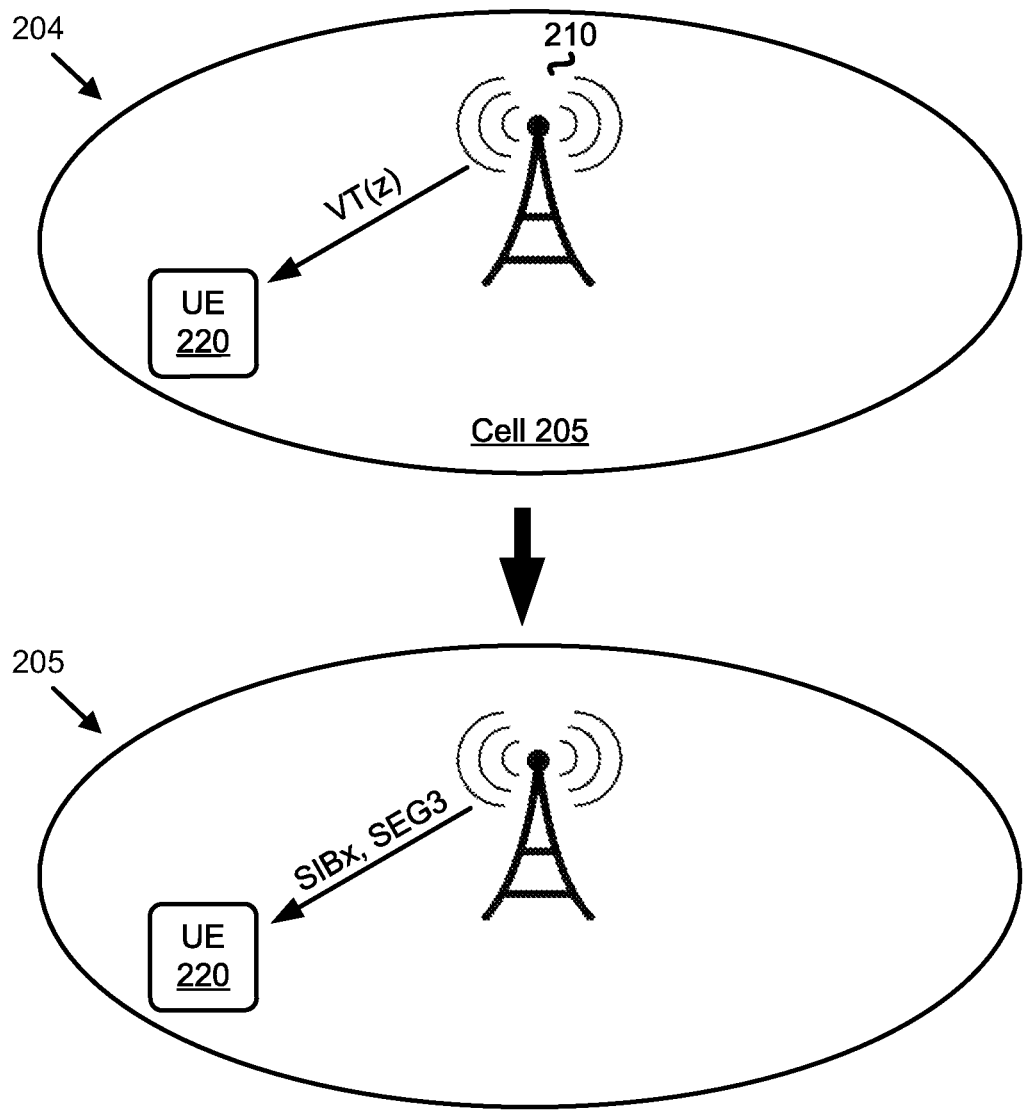

FIGS. 2A-2B are diagrams illustrating the transmission of different value tags and SIB segments associated with a target SIB from a base station to a UE, according to an example implementation of the present application. More specifically, FIGS. 2A-2B illustrate, in five different operational stages 201-205, how base station 210 (or cell 205 associated with base station 210) may transmit two value tags (e.g., value tag (y) and value tag (z)) and three different segments associated with SIBx (e.g., SIB12) to UE 220, and how UE 220 may perform a SIB segmentation validity check process to determine the validity of the received SIB segments.

In stage 201, UE 220 may receive (or be configured with) a first value tag (e.g., value tag (y)) by base station 210. The first value tag (y) may be associated with target SIBx. The UE may receive this value tag/areaScope/systemInformationAreaID from the base station through DL control signaling (e.g., through RRC signaling, such as RRCReconfiguration message with the information element 'dedicatedSIB1-Delivery', which is configured to transmit SIB1 to the UE via UE-specific RRC signaling). Please also note this field has the same values as the corresponding configuration in the broadcasting SIB1) or through SI broadcasting (e.g., SIB1).

In stage 202, base station 210 (or cell 205) may transmit (e.g., broadcast) the first SIB segment of the SIBx (e.g., SIBx, SEG1). UE 220 may determine that since there is no stored SIB segment for this target SIB and since the value tag of this segment is still valid (e.g., VT(y)), the first SIB segment (e.g., SEG1) is valid and therefore may store this SIB segment (e.g., in a memory of the UE). Next, in stage 203, base station 210 may transmit the second SIB segment of the SIBx (e.g., SIBx, SEG2). UE 220 may determine that since the value tag of this second SIB segment is the same as the value tag associated with the stored SIB segment (e.g., it is still VT(y)), the second SIB segment (e.g., SEG2) is also valid and therefore may store this second SIB segment in the memory of the UE as well.

In stage 204 of FIG. 2B, UE 220 may receive (or be configured with) a second value tag (e.g., value tag (z)) by base station 210. The second value tag (z) may also be associated with target SIBx (e.g., the value tag may change because the SIB version may have been updated by this time). UE 220 may receive this new value tag from the base station through DL control signaling (e.g., through RRC signaling) or through SI broadcasting (e.g., SIB1).

Next, in stage 205, base station 210 may transmit a third SIB segment of the SIBx (e.g., SIBx, SEG3). At this stage, however, UE 220 of some implementations may determine that the value tag associated with this third SIB segment (e.g., VT(z)) is not the same as the value tag associated with the currently stored SIB segment (e.g., VT(y)). As such, in some implementations, UE 220 may discard the stored SIB segments (e.g., SEG1 and SEG2) by removing them from its memory, and may instead, store the received third SIB segment (e.g., SEG3) in the memory of the UE (e.g., and any subsequently received SIB segment that is associated with the same value tag, e.g., VT(z)).

In some implementations, a UE may also store the parameters {areaScope=true} and {systemInformationAreaID} associated with the stored SIB segments. Thereafter, the UE may receive a different {systemInformationAreaID} from the serving cell. Under such a circumstance, the UE may discard all of the stored SIB segments and store the latest SIB segments received from its serving cell. It should be noted that in this condition, the {valueTag} associated with the obtained (or new) SIB segments may (or may not) be updated by the UE based on the latest DL control signaling.

In some implementations, a UE may store the parameters {areaScope=true} and {systemInformationAreaID} associated with the stored SIB segments. However, the UE may not later receive {areaScope=true} from the serving cell (e.g., the areaScope may not be present in the received signaling from the serving cell). In this condition, the UE may discard all the stored SIB segments and may store the latest SIB segments received from its serving cell. It should be noted that in this condition, the {valueTag} associated with the obtained (or new) SIB segments may (or may not) be updated by the UE based on the latest DL control signaling.

In some implementations, when the parameter {areaScope} is not present, it means that the stored SIB segments received from the original serving cell are not area-specific and, as such, the UE may not store any {systemInformationAreaID} parameters associated with the stored SIB segments. Although the parameter {areaScope} may not be present, the UE may still receive the parameter {areaScope=true} with a {systemInformationAreaID}, for example, from the latest DL control signaling. If this happens, the UE may discard all the stored SIB segments and may store the latest SIB segment(s) received from its serving cell. It should be noted that under this condition, the parameter {valueTag} associated with the obtained (or newly received) SIB segments may (or may not) be updated by the UE based on the latest DL control signaling.

In some implementations, a UE may (re)select a serving cell (e.g., such that the cellidentity parameter received from the new serving cell may be different from the stored cellidentity parameter associated with the stored SIB segments) on a target frequency associated with a specific service (e.g., V2X-service) and the parameter {areaScope} may not be present in the stored SIB segments. Under such a circumstance, the UE may discard all of the stored SIB segments with their corresponding stored {PLMN-Identity or NPN-Identity}, {valueTag}, {areaScope} (if present), and {systemInformationAreaID} (if present) associated with the stored SIB segments. The UE may then try to reobtain/store the SIB (or SIB segments) associated with the target service (e.g., V2X-SIB) received from the new serving cell.

It should be noted that the serving cell for the target service, in some implementations, may not be the Primary Cell or the Primary Secondary Cell or the Secondary Cell of the UE. Moreover, the serving cell may not be the cell the UE may maintain and/or with which the UE may initiate an RRC Connection in the serving RAN.

In some implementations, after collecting and storing all the SIB segments associated with a target SIB successfully, the UE may start assembling the complete target SIB. After assembling the target SIB, in some of the present implementations, the UE may also remap the stored parameters, such as the {valueTag}, {areaScope} (if present), {systemInformationAreaID} (if present), cellidentity, and/or {PLMN-Identity or NPN-Identity} to be associated with the assembled target SIB.

In some implementations, the UE may not consider the stored SIB segments as a valid version associated with the target SIB before the UE assembles the complete target SIB based on the stored SIB segments. As such, before the UE assembles the complete target SIB, the UE may still be allowed to request the target SIB through, for example, a random access procedure (2-step and/or 4-step random access procedure). Moreover, for an RRC Connected UE, the UE may be allowed to request the target SIB through UE-specific control signaling (e.g., based on the configuration received from a serving cell).

II. Under the Coverage Area of Multiple Cells

Some aspects of the present implementations may further identify the UE and/or RAN behaviour during (or after) a cell reselection process and when the stored SIB segments are associated with a specific systemInformationAreaID. Under such circumstances, in some implementations, the UE may store and assemble the SIB segments received from different cells if the same SIB (e.g., and the same SIB segmentation approach) is used within the cells (e.g., that provide the same systemInformationAreaID in the DL control signaling for the target SIB).

In some implementations, a UE may keep the stored SIB segments after a cell (re)selection procedure (or when an intra-frequency/inter-frequency/inter-RAT/inter-system cell (re)selection procedure) is triggered for the target service (e.g., V2X service). The UE, in some such implementations, may check the validity of SIB segments after the cell (re)selection procedure (or upon the reception of SIB1/SIB segments from the (intra-frequency/inter-frequency/inter-RAT/inter-system) neighbouring/target cell).

In some implementations, after receiving a new SIB segment, a UE may determine that the stored SIB segments are still valid if the associated {areaScope} of the stored segments is stored, and the ({valueTag}, {systemInformationAreaID}) of the stored SIB segments are the same as the ({valueTag}, {systemInformationAreaID}) of the received SIB segment. The UE may receive the system information from the serving (or target/neighbouring or newly selected) cell (e.g., by reading the si-SchedulingInfo of SIB1, which is broadcast by the serving (or target/neighbouring or newly selected) cell).

Additionally, the UE may try to receive other SIB segments by monitoring the broadcasting system information from the newly selected serving cell. In such a case, the UE may assemble the complete target SIB by combining the SIB segments received from two or more selected serving cells.

Conversely, a UE may discard the stored SIB segments (and the stored information associated with the stored SIB segments) if the UE determines that the stored SIB segments are invalid for the current serving cell. For example, if the ({valueTag}, {systemInformationAreaID}) of the stored SIB segments are not the same as the ({valueTag}, {systemInformationAreaID}) of the received system information, the UE may discard the stored SIB segments and subsequently store the SIB segments (and the information associated with the stored SIB segments) received from the newly selected serving cell.

In some implementations, the PLMN may also be included as part of the information of the area-specific SIB segments. In some such implementations, the UE may also record the SIB segments to be associated with the parameter PLMN-Identity, which may also be provided by the same serving cell that broadcasts the SIB segments.

During a SIB segmentation validity check procedure, a UE may determine that the stored SIB segments are still valid (e.g., for a serving cell) if the serving cell is a non-NPN-only cell and the first PLMN-identity included in the PLMN-IdentityInfoList is identical to the PLMN-Identity associated with the stored SIB segments, and the {valueTag} and {systemInformationAreaID} provided by the serving cell are also the same as the {valueTag} and {systemInformationAreaID} associated with the stored SIB segments.

Additionally, if the serving cell is a NPN-only cell and the first NPN-Identity included in the NPN-IdentityInfoList is identical to the NPN-Identity associated with the stored SIB segments, and the {valueTag} and {systemInformationAreaID} provided by the serving cell are also the same as the {valueTag} and {systemInformationAreaID} associated with the stored SIB segments, the UE may determine that the stored SIB segments are valid for the cell.

As such, under these circumstances, the UE may assemble the complete target SIB by combining the SIB segments received from more than one selected serving cells and stored in the UE. Otherwise, the UE may discard the stored SIB segments (and the stored information associated with the stored SIB segments) if the UE determines that the stored SIB segments are invalid (e.g., for the serving cell). When the UE determines that the SIB segments stored at the UE are not valid, the UE may reobtain/store the SIB segments (and the information associated with the stored SIB segments) received from the newly selected serving cell.

Figure 3A:
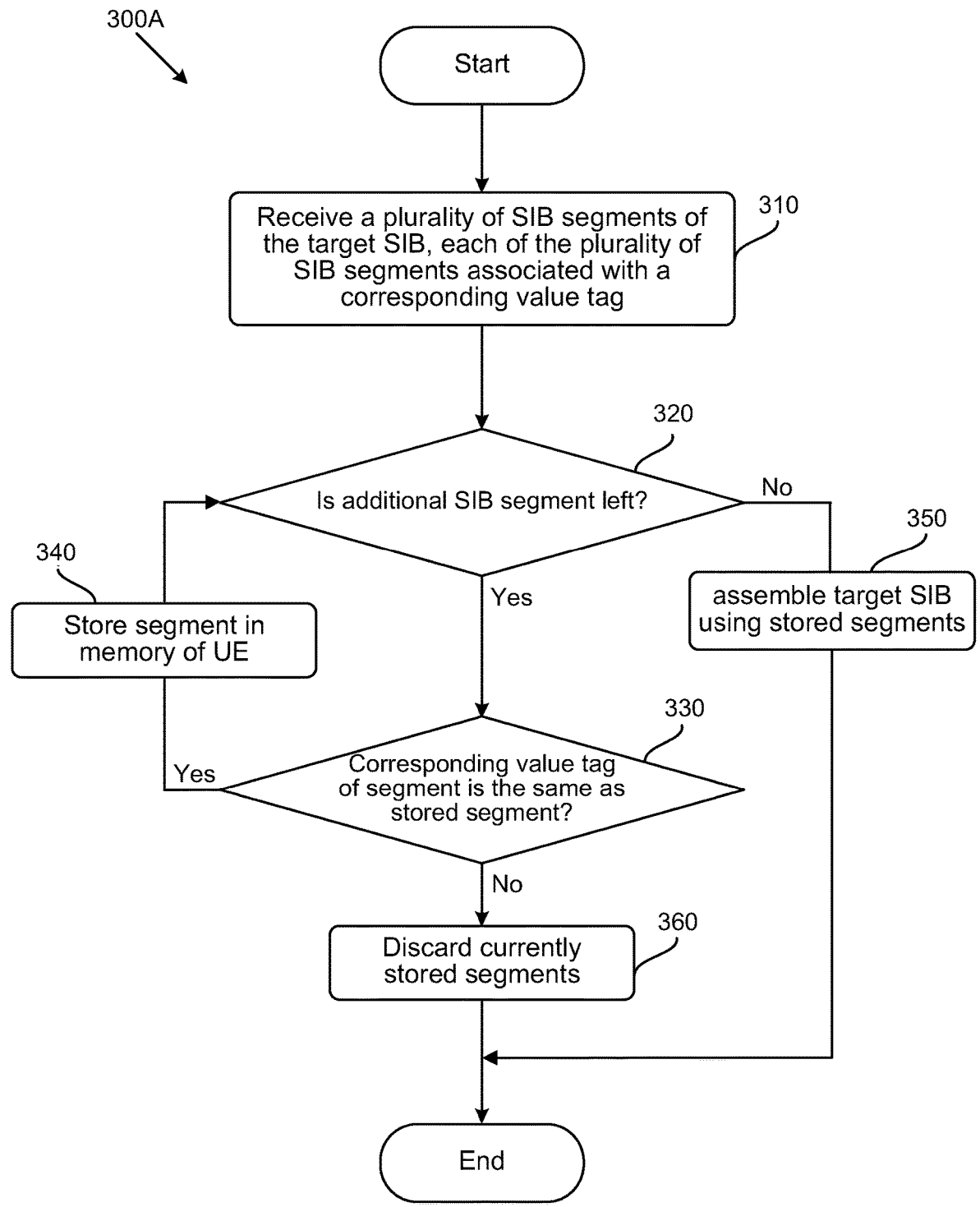
FIG. 3A is a flowchart illustrating a method (or process) performed by a UE to assemble a target SIB for a target service after a successful reception of the different SIB segments of the target SIB from one or more serving cells, according to an example implementation of the present application.

FIG. 3A is a flowchart illustrating a method (or process) 300A performed by a UE to assemble a target SIB for a target service after successfully receiving the different SIB segments of the target SIB from one or more serving cells and storing the SIB segments, according to an example implementation of the present application.

Process 300A may start, at 310, by receiving, for example, from a first cell on a first frequency carrier, a plurality of SIB segments of a target SIB. As described above, each of the plurality of SIB segments may be associated with a corresponding value tag (previously) configured to the UE in some implementation.

Process 300A may then determine, at 320, whether any additional SIB segments (e.g., in the plurality of SIB segments) is left to be processed. For the first time the process is performed, since there is at least one more segment (e.g., the first SIB segment) is left to be processed, the process may determine that a segment is left and may proceed to action 330. In action 330 process 300A may determine whether a corresponding value tag of the currently processed SIB segment is the same as the corresponding value tag of the first SIB segment. Again, when the processed is performed for the first time, the value tag of the currently processed segment (e.g., the first segment) is the same as the value tag corresponding to the first SIB segment. As such, the process may store, at 340, the currently processed SIB segment, for example, in a memory of the UE. Process 300A may then return to action 320 to determine whether any additional SIB segment is left to be processed.

In case all the processed segments have the same value tag, as the first SIB segment, and the last SIB segment has been processed successfully too, process 300A may proceed to action 350 to assemble the target SIB using the stored plurality of SIB segments. However, if for any of the processed segments before reaching the end of the plurality of segments, process 300A determines, at 330, that the value tag associated with the currently processed SIB segment is different than the value tag associated with the first SIB segment, the process may discard, at 360, the currently stored segments. For example, the process may remove all the stored SIB segments from the memory and start storing any new SIB segment that is associated with the new value tag. The process may then end.

In some implementations, if during a SIB segmentation validity check process (e.g., while the UE is storing the SIB segments of a target SIB), the UE moves from the current serving cell to a second cell (e.g., by (re)selecting the second cell), irrespective of the second cell being on the same frequency carrier of the first cell or not, the UE may drop all the stored SIB segments upon selection of the second cell. In some implementations, the first frequency carrier of the first cell may include a serving frequency carrier for the UE, and the first cell and the second selected cell may include serving cells of the UE. In some other implementations, the first frequency carrier may include a non-serving frequency carrier for the UE, and the first cell and the second cell may not be the serving cells of the UE.

In some implementations, when the corresponding value tag of a currently processed SIB segment is not the same as the corresponding value tag of the first SIB segment, process 300A may store the currently processed SIB segment in the memory of the UE and may remove the first SIB segment and all previously stored SIB segments that have the same value tag as the first SIB segment from the memory.

In some implementations, after assembling the target SIB successfully, process 300A may configure a validity area of the target SIB with a first area identification (ID) if the target SIB is associated with a first areascope information element (IE) (e.g., when both the first areascope IE and the first area ID are broadcast by the first cell). Process 300A may then select a second cell on the first frequency carrier, the second cell broadcasting a second area scope IE and a second area ID associated with a second SIB which is configured by the second cell to support the same target service. The process may then determine that the stored target SIB is still valid during the selection of the second cell if the second area ID is the same as the first area ID associated with the target SIB. In some such implementations, process 300A may select a third cell on the first frequency carrier, where the third cell broadcasts a third area ID, which is different from the first area ID associated with the target SIB, and may determine that the target SIB is not valid during the selection of the third cell.

In some implementations, process 300A may select a third cell on the first frequency carrier, where the third cell does not broadcast any SIB related information that supports the same target service, or the third cell broadcasts data associated with a third SIB that supports the same target service but does not have an associated areascope IE. The process may then determine that the stored target SIB is not valid during the selection of the third cell.

In some implementations, after assembling the target SIB successfully, process 300A may configure a validity area associated with the target SIB on the UE if the target SIB is not associated with any areascope information element (IE) sent by the first cell.

In some implementations, the target service my include a new radio (NR) sidelink communication service and the target SIB may include an NR sidelink radio configuration. In some such implementations, after reselecting another cell on the first frequency carrier, process 300A may implement the NR sidelink communication service based on the NR sidelink radio configuration in the stored target SIB if the stored target SIB is determined to be valid on the reselected cell.

Figure 3B:
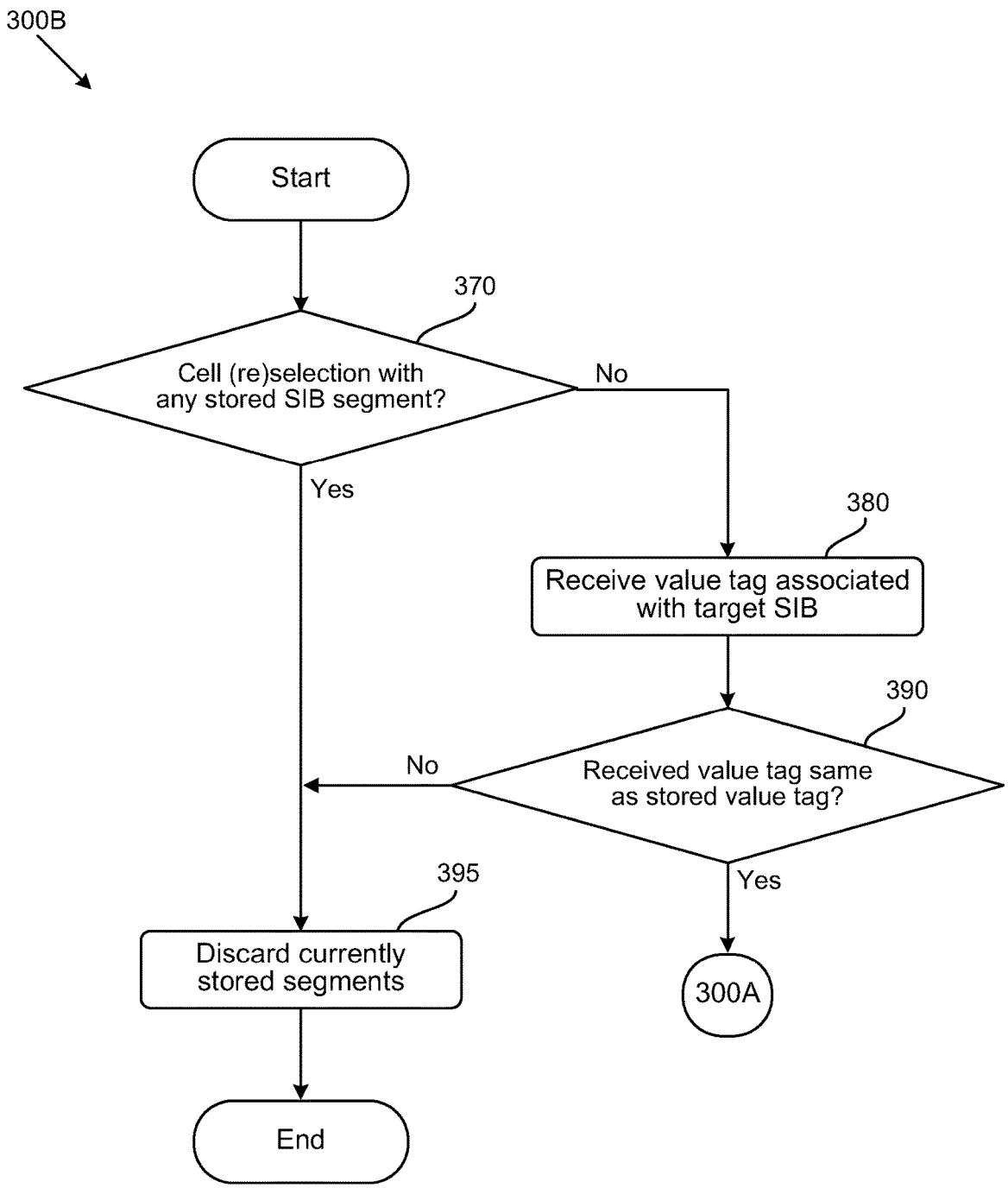
FIG. 3B is a flowchart illustrating a method (or process) performed by a UE to assemble a target SIB for a target service after a cell (re)selection, according to an example implementation of the present application.

FIG. 3B is a flowchart illustrating a method (or process) 300B performed by a UE to assemble a target SIB for a target service after a cell (re)selection, according to an example implementation of the present application.

Process 300B may check the validity of the stored SIB segments (if there is any) by first determining, in action 370, whether a cell selection or cell re-selection procedure has been triggered by the UE while the UE has previously stored one or more SIB segments. Such a determination may be made before the target SIB is assembled by the UE successfully. Then, after action 310, the process may discard, at 395, the stored SIB segments if process 300B determines that a cell selection/cell re-selection procedure has been triggered, for example, during a SIB segment reception procedure and the UE has already stored at least one SIB segment from a plurality of first SIB segments of the target SIB. In contrast, the UE may keep monitoring the value tag associated with the target SIB/SIB segments (e.g., via receiving the SIB1 from the serving cell). For example, in action 380, process 300B may receive a value tag associated with the target SIB or the target SIB segment(s) when the UE is staying at the same serving cell during the SIB segments reception procedure or the UE has just started receiving the SIB segment(s) of the target SIB (e.g., when the UE has not stored any SIB segment of the target SIB yet).

In action 390, process 300B may determine whether a corresponding value tag (e.g., which is transmitted via the currently received SIB1 of the serving cell) of the target SIB/SIB segments is the same as the corresponding value tag of the stored SIB segment(s). Again, when the process 300B is performed for the first time, the UE may store the value tag of the target SIB/SIB segment(s) (e.g., which the UE receives via the currently received SIB1), for example, in a memory of the UE as the value tag of the SIB segment(s). Process 300B may then execute process 300A to receive new SIB segments if process 300B determines that the value tag of the currently received target SIB information (in the currently received SIB1) is the same as the value tag corresponding to the stored SIB segment(s) and additional SIB segments are left to be received. During executing process 300A, the UE may try to decode and obtain the additional SIB segments during a System Information (SI) window time period configured by the serving/non-serving cell (e.g., the SI window configuration may have also been transmitted in the SIB1). As described above with reference to process 300A, for the first time the process is implemented, the UE may receive and store a first SIB segment in the memory module of UE. Then, the UE may check to see whether all of the SIB segments for the target SIB have been received by the UE while checking whether the value tag, during the SIB segment reception and before successfully receiving all of the segments, is changed. The actions UE may take next are described above with reference to FIG. 3A. It should be noted that, in some implementations, the UE may skip action 330 and action 360 in process 300A if the UE has checked the value tag associated with the target SIB/SIB segments and the value tag associated with the stored (first) SIB segment(s) (e.g., the UE has implemented action 380 and action 390 in a running process 300B and then the process 300A is triggered after action 390). It should also be noted that, in this condition, in the running process 300A, the UE may directly store the received SIB segments in the action 320 of process 300A if there is still at least one target SIB segment left.

On the other hand, if process 300B determines that the received value tag is not the same as the currently stored (or configured) value tag of the UE, the process may proceed to action 395 to discard all the currently stored SIB segments of the target SIB. The process may then end. In some implementations, the UE may obtain the scheduling information for the target SIB (e.g., the SI window period of the target SIB/SIB segments) via SIB 1.

In some implementations, if during a SIB segmentation validity check process (e.g., while the UE is storing any SIB segments of a target SIB), the UE moves from the current serving cell to a second cell (e.g., by (re)selecting the second cell) in the same frequency carrier or different frequency carriers (e.g., intra-frequency cell (re)selection or inter-frequency cell (re)selection), irrespective of the frequency carrier is a serving frequency carrier or a non-serving frequency carrier to the UE, the UE may drop all the stored SIB segments upon selection of the second cell. In some implementations, the first frequency carrier of the first cell may include a serving frequency carrier for the UE, and the first cell and the second selected cell may include serving cells (e.g., primary cell, primary secondary cell, or secondary cell) of the UE. In some other implementations, the first frequency carrier may include a non-serving frequency carrier for the UE, and the first cell and the second cell may not be the serving cells of the UE.

In some implementations, as described above, after assembling the target SIB successfully, the UE may configure the downlink coverage of the first cell, which is the serving cell while the UE assembles the target SIB successfully, as the validity area associated with the target SIB on the UE if the target SIB is not associated with any areascope information element (IE) sent by the first cell.

In some implementations, as described above, the target service my include a new radio (NR) sidelink communication service and the target SIB may include an NR sidelink radio configuration. In some such implementations, after reselecting another cell on the first frequency carrier, the UE may implement the NR sidelink communication service based on the NR sidelink radio configuration in the stored target SIB if the stored target SIB is determined to be valid on the reselected cell.

In some implementations, a cell may change the valueTag associated with a SIB when the cell changes or modifies the segmentations associated with the SIB (e.g., even when the complete SIB is still the same). In some implementations, a cell may also need to initiate a system information modification procedure to change the SIB segmentation procedure (e.g., even when the complete SIB is still the same). In some such implementations, when a UE receives an indication(s) of the SI modification procedure due to a change in the SIB segmentation procedure, the UE may discard all the stored SIB segments. Additionally, if the UE receives an indication(s) of the SI modification procedure due to the change of the SIB segmentation procedure, the UE may also discard the stored SIB segments related to the SIB which is to be modified.

In some implementations, the SI change indication described above may be transmitted by the cell in a paging message (e.g., via a short message, which may be broadcast by the serving cell in (at least) one Physical Downlink Control Channel (PDCCH)) within one modification period (e.g., for system information change) and may not be applied to the SIB segmentation changes. In other words, in some implementations, the base statin may not set the SI change indication to be true (or set to be equal to 1) in the paging message when the SIB segmentation approach changes, but the content of the SIB is still the same.

In some implementations, a cell may need not to initiate a system information modification procedure to change the SIB segmentation approach. Instead, the cell may change its valueTag directly and then deliver the SIB (e.g., V2X-SIB) with a different SIB segmentation approach. In this condition, the UE may be responsible to check the latest valueTag before the UE assembles a complete SIB from the stored SIB segments successfully.

In some implementations, a cell may not change its valueTag associated with the SIB when the cell changes the segmentation approach associated with a target SIB (e.g., even when the complete SIB is still the same). In some other implementations, a cell may change its valueTag associated with a target SIB when the cell changes the segmentation approach associated with the target SIB (e.g., even when the complete SIB is still the same). In some implementations, the cell may change the SIB delivery approach before the UE assembles the complete target SIB (e.g., V2X-SIB) successfully. For example, the cell may change its si-BroadcastStatus associated with the target SIB from {broadcasting} to {non-broadcasting} before the UE assembles the complete target SIB successfully. Under such a circumstance, the UE may still maintain the stored SIB segments and may then initiate (a 2-step or 4-step) random access procedure to request the target SIB again. Alternatively, the UE (e.g., in an RRC_CONNECTED state) may still maintain the stored SIB segments and then transmit an RRC message (e.g., a dedicatedSIBRequest message) to the serving cell to request the target SIB. Upon the transmission of the RRC message (e.g., the dedicatedSIBRequest message) to the serving cell, the UE may start a timer (e.g., a T350 parameter in the NR protocol, such as what is described in the 3GPP TS 38.331 v16.0.0).

In some implementations, a UE may move from an RRC Idle/Inactive state to an RRC Connected state before the UE assembles the complete target SIB successfully. Moreover, the UE may be allowed to request the target SIB through dedicated control signaling (e.g., even when the UE has stored the SIB segments of the target SIB). As such, the serving cell may transmit the complete target SIB to the UE through UE-specific dedicated control signaling, such as through an RRC(Connection)Reconfiguration message. Under such a condition, the UE may be allowed to send the target SIB request message to the serving cell. Moreover, the UE may discard the stored SIB segments of the target SIB after the UE receives the complete target SIB from the serving cell (e.g., when receiving the RRC(Connection) Reconfiguration message successfully).

In some implementations, a UE may still maintain the stored SIB segments after the UE moves from an RRC Inactive/Idle state to an RRC Connected state. Moreover, when the UE is requesting the target SIB, the UE may not request the complete target SIB (e.g., SIB12). Instead, the UE may request only the SIB segments that the UE needs to assemble the complete target SIB. For example, if the serving cell broadcasts the following SIB segments: {SIB segment #0, SIB segment #1, SIB segment #2, SIB segment #3, SIB segment #4, SIB segment #5}, once the UE moves to an RRC Connected state with stored {SIB segment #0, SIB segment #2, SIB segment #3, SIB segment #5}, then while the UE is requesting for the target SIB from the serving cell, the UE may need to further indicate that the only SIB segment(s) the UE needs are segments 1 and 4 by transmitting one additional information element (IE): {Request SIB segment Number=1, 4} to the serving cell. After receiving such additional IE, the serving cell may simply deliver the requested SIB segments (e.g., {SIB segment #1, SIB segment #4}) to the UE (e.g., through the RRC(Connection)Reconfiguration message).

In some implementations, the serving cell may also indicate one additional IE to enable/disable SIB segment request (e.g., SIB segmentRequest={enabled or disabled}) which may be transmitted to the UE through dedicated control signaling or broadcasting system information. The UE nay then be able to request specific SIB segments from the serving cell. Therefore, if the SIB segmentRequest message is enabled, the UE may further indicate the SegmentNumber(s) of the SIB segment that the UE needs for target SIB assembly when the UE requests the target SIB from the serving cell (e.g., dedicatedSIBRequest message). In contrast, if the SIB segmentRequest message is disabled, the UE may not be able to further indicate the SegmentNumber(s) of the SIB segment that the UE needs.

It should be noted that the SIB segmentRequest may be transmitted by the UE to the serving cell through a 2-step random access procedure (e.g., the UE may transmit the SIB segmentRequest message in the PUSCH of MSGA) or through a 4-step random access procedure (e.g., the UE may transmit the SIB segmentRequest message in the MSG3 or MSG5). For a UE that is in an RRC Connected state, the UE may transmit the SIB segmentRequest message to the serving cell through UEAssistInformation, or UEsidelinkAssistanceInformation. In some additional embodiments, one bitmap may be transmitted in the SIB segmentRequest message, with each bit being associated with one SIB segment. The UE may then set a bit=1 to represent that the UE requests the corresponding SIB segment. Otherwise, the UE may set a bit=0 to represent that the UE does not request the corresponding SIB segment. In addition, the right-most bit may be associated with the SIB segment of Segment-Number=0 and the left-most bit may be associated with the SIB segment of segmentType=the Last SIB segment.

In some implementations, one or more errors may happen during a SIB-assembly procedure. When an error happens, the UE may reply a 'SIB segment assembly error event' message to the serving cell. In some implementations, the UE may transmit the 'SIB segment assembly error event' message to the serving cell through a 2-step RA procedure (e.g, through MSGA delivery) or a 4-step RA procedure (e.g., through MSG3 or MSG5 delivery). In some other implementations, the UE (e.g., a UE in the RRC Connected state) may transmit the 'SIB segment assembly error event' message to the serving cell through UE-specific dedicated control signaling.

In some implementations, a prohibit timer (e.g., the T sib-assembly-error parameter) may be provided to the UE to limit the UE to trigger the 'SIB segment assembly error event' only after the timer expires. As such, when a SIB segment assembly error event happens, the UE may trigger a timer (e.g., the prohibit timer) and then count the running timer from an initial value to zero. The UE may not be initiated to transmit the 'SIB segment assembly error event' message to the serving cell while the timer is still running or counting. Additionally, the UE may still try to receive and assemble the target SIB while the prohibit timer is still counting. Then, after the prohibit timer is expired (or after the prohibit timer counts to zero), the UE may initiate the SIB segment assembly error event report procedure and report the error to the serving cell. Moreover, the UE may discard all the stored SIB segments after the timer expires. Also, the initial value of the parameter T sib-assembly-error may be transmitted to the UE through broadcasting system information or through UE-specific dedicated control signaling. Moreover, the UE may stop (or release) the counting T sib-assembly-error after the UE obtains the complete target SIB. In addition, the UE may stop (or release) the counting T sib-assembly-error after the UE discards all the stored SIB segments. The UE may reset the T sib-assembly-error if the UE receives a new configuration from the serving cell.

Table 1 below includes an example of a SIB and/or SIB segmentation validity check procedure performed by a UE.

TABLE 1

Figure 4:
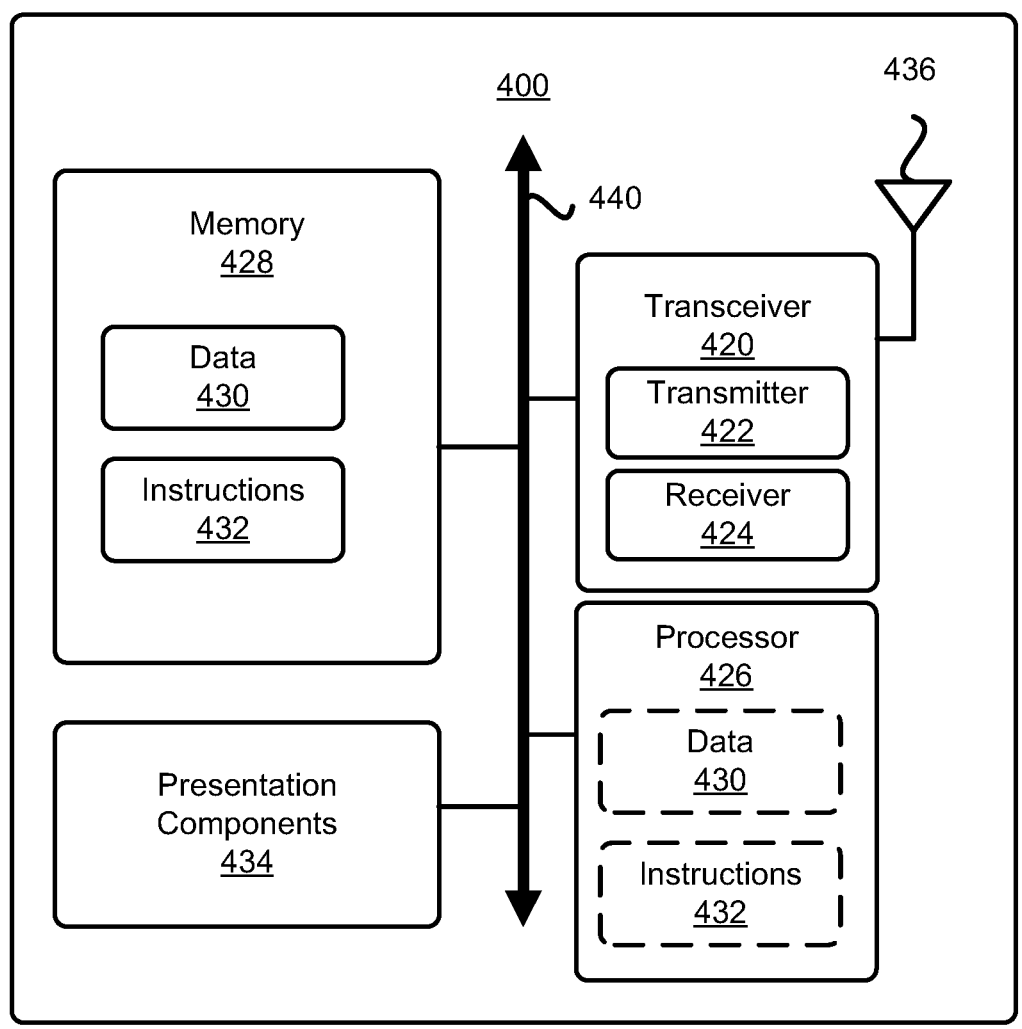
FIG. 4 illustrates a block diagram of a node for wireless communication, according to one example implementation of the present application.

Upon receiving SIB12, the UE shall:
1> If the complete SIB12 has not been assembled within a period of 3 hours
   a. the UE should discard any stored segments for SIB12
1> else if the complete SIB12 has been assembled within a period of 3 hours
   a. the UE should confirm the assembled SIB12 as valid at this moment.
[. . .]
For SIB validity, the UE shall:
1> delete any stored version of a SIB after 3 hours from the moment it was successfully confirmed as valid.
1> for each stored version of a SIB or a SIB segment:
   a. if the areaScope is associated and its value for the stored version of the SIB is the same as the value received in the si-SchedulingInfo for that SIB from the serving cell:
      i. if the cell is non-NPN-only cell and the first PLMN-Identity included in the PLMN-IdentityInfoList, the systemInformationAreaID and the valueTag that are included in the si-SchedulingInfo for the SIB received from the serving cell are identical to the PLMN-Identity, the systemInformationAreaID and the valueTag associated with the stored version of that SIB:
         1. consider the stored SIB or the stored SIB segment as valid for the cell.
      ii. if the cell is an NPN-only cell and the first NPN-Identity included in the NPN-IdentityInfoList, the systemInformationAreaID and the valueTag that are included in the si-SchedulingInfo for the SIB received from the serving cell are identical to the NPN-Identity, the systemInformationAreaID and the valueTag associated with the stored version of that SIB:
         1. consider the stored SIB or the stored SIB segment as valid for the cell.
   b. if the areaScope is not present for the stored version of the SIB and the areaScope value is not included in the si-SchedulingInfo for that SIB from the serving cell:
      i. if the cell is non-NPN-only cell and the first PLMN-Identity in the PLMN-IdentityInfoList, the cellIdentity and valueTag that are included in the si-SchedulingInfo for the SIB received from the serving cell are identical to the PLMN-Identity, the cellIdentity and the valueTag associated with the stored version of that SIB:
         1. consider the stored SIB or the stored SIB segment as valid for the cell.
      ii. if the cell is an NPN-only cell and the first NPN-Identity in the NPN-IdentityInfoList, the cellIdentity and valueTag that are included in the si-SchedulingInfo for the SIB received from the serving cell are identical to the NPN-Identity, the cellIdentity and the valueTag associated with the stored version of that SIB:
         1. consider the stored SIB or the stored SIB segment as valid for the cell FIG. 4 illustrates a block diagram of a node for wireless communication, according to one example implementation of the present application. As shown in FIG. 4, node 400 may include transceiver 420, processor 426, memory 428, one or more presentation components 434, and at least one antenna 436. Node 400 may also include a Radio Frequency (RF) spectrum band module, a base station communications module, a network communications module, and a system communications management module, input/output (I/O) ports, I/O components, and power supply (not explicitly shown in FIG. 4). Each of these components may be in communication with each other, directly or indirectly, over one or more buses 440.

Transceiver 420 having transmitter 422 and receiver 424 may be configured to transmit and/or receive time and/or frequency resource partitioning information. In some implementations, transceiver 420 may be configured to transmit in different types of subframes and slots including, but not limited to, usable, non-usable and flexibly usable subframes and slot formats. Transceiver 420 may be configured to receive data and control signaling.

Node 400 may include a variety of computer-readable media. Computer-readable media can be any available media that can be accessed by node 400 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 428 may include computer-storage media in the form of volatile and/or non-volatile memory. Memory 428 may be removable, non-removable, or a combination thereof. Exemplary memory includes solid-state memory, hard drives, optical-disc drives, etc. As illustrated in FIG. 4, memory 428 may store computer-readable, computer-executable instructions 432 (e.g., software codes) that are configured to, when executed, cause processor 426 to perform various functions described herein, for example, with reference to FIGS. 1 through 4. Alternatively, instructions 432 may not be directly executable by processor 426 but be configured to cause node 400 (e.g., when compiled and executed) to perform various functions described herein.

Processor 426 may include an intelligent hardware device, for example, a central processing unit (CPU), a microcontroller, an ASIC, etc. Processor 426 may include memory. Processor 426 may process data 430 and instructions 432 received from memory 428, and information through transceiver 420, the base band communications module, and/or the network communications module. Processor 426 may also process information to be sent to transceiver 420 for transmission through antenna 436, to the network communications module for transmission to a core network.

One or more presentation components 434 presents data indications to a person or other device. For example, one or more presentation components 434 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for assembling a target system information block (SIB) for a target service, the method comprising:
   receiving, from a first cell on a first frequency carrier, a plurality of SIB segments of the target SIB, each of the plurality of SIB segments associated with a corresponding value tag;
   storing a first SIB segment in the plurality of SIB segments in a memory of the UE;
   for each subsequent SIB segment in the plurality of SIB segments:
      determining whether a corresponding value tag of the subsequent SIB segment is the same as the corresponding value tag of the first SIB segment; and
      storing the subsequent SIB segment in the memory of the UE when the corresponding value tag of the subsequent SIB segment is the same as the corresponding value tag of the first SIB segment; and
   assembling the target SIB using the stored plurality of SIB segments.

2. The method of claim 1, further comprising:
   selecting, by the UE, a second cell on the first frequency carrier before the assembling of the target SIB successfully; and
   dropping the stored SIB segments of the plurality of SIB segments after selecting the second cell.

3. The method of claim 2, wherein:
   the first frequency carrier comprises a serving frequency carrier for the UE, and
   the first cell and the second cell are serving cells of the UE.

4. The method of claim 2, wherein:
   the first frequency carrier comprises a non-serving frequency carrier for the UE, and
   the first cell and the second cell are not serving cells of the UE.

5. The method of claim 1, further comprising, when the corresponding value tag of the subsequent SIB segment is not the same as the corresponding value tag of the first SIB segment:
   storing the subsequent SIB segment in the memory of the UE; and removing the first SIB segment and all previously stored SIB segments that have the same value tag as the first SIB segment from the memory.

6. The method of claim 1, further comprising:
after assembling the target SIB successfully, configuring a validity area of the target SIB with a first area identification (ID) if the target SIB is associated with a first areascope information element (IE), wherein both the first areascope IE and the first area ID are broadcast by the first cell;
selecting, by the UE, a second cell on the first frequency carrier, the second cell broadcasting a second areascope IE and a second area ID associated with a second SIB which is configured by the second cell to support the same target service; and
determining that the assembled target SIB is still valid during the selection of the second cell if the second area ID is the same as the first area ID associated with the target SIB.

7. The method of claim 6, further comprising:
selecting, by the UE, a third cell on the first frequency carrier, the third cell broadcasting a third area ID, which is different from the first area ID associated with the target SIB; and
determining that the target SIB is not valid during the selection of the third cell.

8. The method of claim 6, further comprising:
selecting, by the UE, a third cell on the first frequency carrier, wherein the third cell does not broadcast any SIB related information that supports the same target service, or the third cell broadcasts data associated with a third SIB that supports the same target service but does not have an associated areascope IE; and
determining that the assembled target SIB is not valid during the selection of the third cell.

9. The method of claim 1, further comprising:
after assembling the target SIB successfully, configuring downlink coverage of the first cell as a validity area associated with the target SIB on the UE if the target SIB is not associated with any areascope information element (IE) sent by the first cell.

10. The method of claim 1, wherein the target service comprises a new radio (NR) sidelink communication service and the target SIB includes an NR sidelink radio configuration, the method further comprising:
after reselecting another cell on the first frequency carrier, implementing the NR sidelink communication service based on the NR sidelink radio configuration in the assembled target SIB if the assembled target SIB is determined to be valid on the reselected cell.

11. A user equipment (UE), comprising:
one or more non-transitory computer-readable media having computer-executable instructions for assembling a target system information block (SIB) for a target service; and
at least one processor coupled to the one or more non-transitory computer-readable media, and configured to execute the computer-executable instructions to:
receive, from a first cell on a first frequency carrier, a plurality of SIB segments of the target SIB, each of the plurality of SIB segments associated with a corresponding value tag;
store a first SIB segment in the plurality of SIB segments in a memory of the UE;
for each subsequent SIB segment in the plurality of SIB segments:
determine whether a corresponding value tag of the subsequent SIB segment is the same as the corresponding value tag of the first SIB segment; and
store the subsequent SIB segment in the memory of the UE when the corresponding value tag of the subsequent SIB segment is the same as the corresponding value tag of the first SIB segment; and
assemble the target SIB using the stored plurality of SIB segments.

12. The UE of claim 11, wherein the at least one processor is further configured to execute the computer-executable instructions to:
select a second cell on the first frequency carrier before the assembling of the target SIB successfully; and
drop the stored SIB segments of the plurality of SIB segments after selecting the second cell.

13. The UE of claim 12, wherein:
the first frequency carrier comprises a serving frequency carrier for the UE, and
the first cell and the second cell are serving cells of the UE.

14. The UE of claim 12, wherein:
the first frequency carrier comprises a non-serving frequency carrier for the UE, and
the first cell and the second cell are not serving cells of the UE.

15. The UE of claim 11, wherein the at least one processor is further configured to execute the computer-executable instructions to, when the corresponding value tag of the subsequent SIB segment is not the same as the corresponding value tag of the first SIB segment:
store the subsequent SIB segment in the memory of the UE; and
remove the first SIB segment and all previously stored SIB segments that have the same value tag as the first SIB segment from the memory.

16. The UE of claim 11, wherein the at least one processor is further configured to execute the computer-executable instructions to:
after assembling the target SIB successfully, configure a validity area of the target SIB with a first area identification (ID) if the target SIB is associated with a first areascope information element (IE), wherein both the first areascope IE and the first area ID are broadcast by the first cell;
select a second cell on the first frequency carrier, the second cell broadcasting a second areascope IE and a second area ID associated with a second SIB which is configured by the second cell to support the same target service; and
determine that the assembled target SIB is still valid during the selection of the second cell if the second area ID is the same as the first area ID associated with the target SIB.

17. The UE of claim 16, wherein the at least one processor is further configured to execute the computer-executable instructions to:
select a third cell on the first frequency carrier, the third cell broadcasting a third area ID, which is different from the first area ID associated with the target SIB; and
determine that the target SIB is not valid during the selection of the third cell.

18. The UE of claim 16, wherein the at least one processor is further configured to execute the computer-executable instructions to:

select a third cell on the first frequency carrier, wherein the third cell does not broadcast any SIB related information that supports the same target service, or the third cell broadcasts data associated with a third SIB that supports the same target service but does not have an associated areascope IE; and determine that the assembled target SIB is not valid during the selection of the third cell.

19. The UE of claim 11, wherein the at least one processor is further configured to execute the computer-executable instructions to:

after assembling the target SIB successfully, configure downlink coverage of the first cell as a validity area associated with the target SIB on the UE if the target SIB is not associated with any areascope information element (IE) sent by the first cell.

20. The UE of claim 11, wherein the target service comprises a new radio (NR) sidelink communication service and the target SIB includes an NR sidelink radio configuration, wherein the at least one processor is further configured to execute the computer-executable instructions to:

after reselecting another cell on the first frequency carrier, implement the NR sidelink communication service based on the NR sidelink radio configuration in the assembled target SIB if the assembled target SIB is determined to be valid on the reselected cell.

* * * * *